H. J. PODLEŠÁK.
INTERNAL COMBUSTION ENGINE MIXER.
APPLICATION FILED JAN. 6, 1913.
1,150,224.
Patented Aug. 17, 1915.
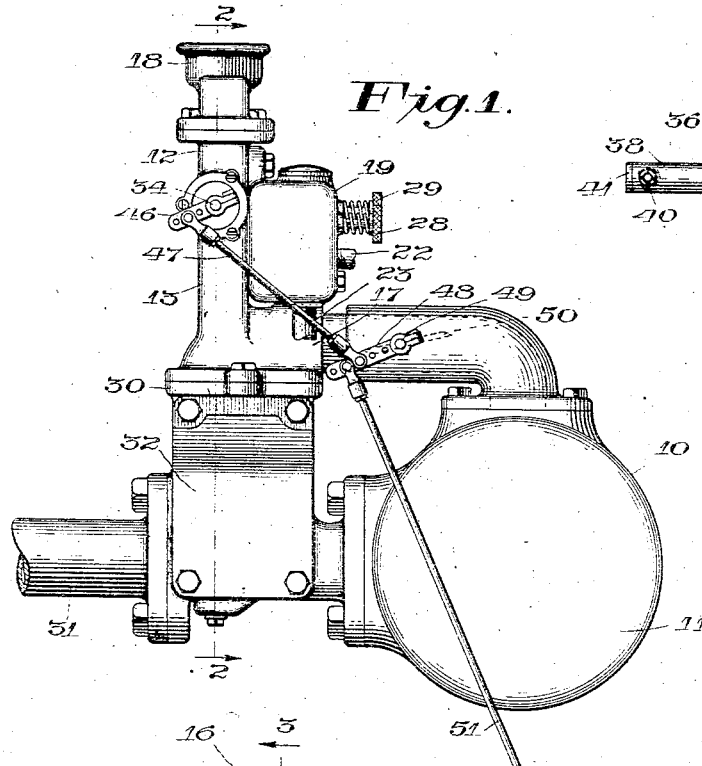
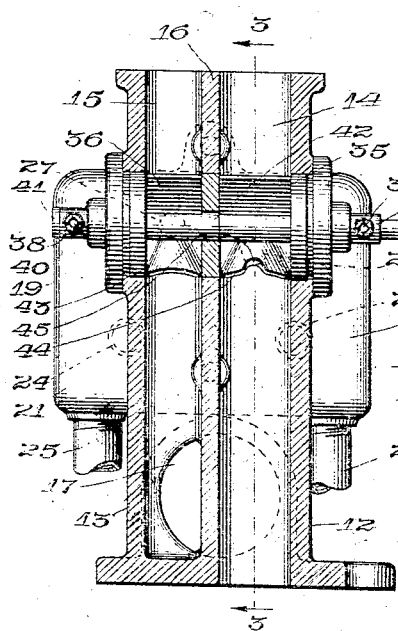
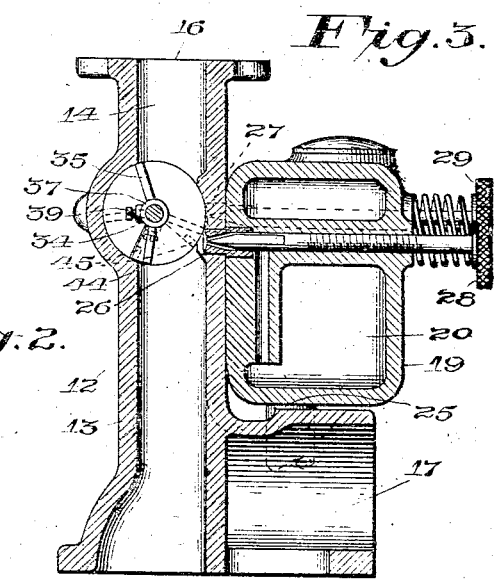
Witnesses:
F. W. Hoffmeister
Chas. L. Byron
Inventor
Henry J. Podlešák,
By Chas. E. Lord
Atty.

UNITED STATES PATENT OFFICE.

HENRY J. PODLEŠÁK, OF CHICAGO, ILLINOIS, ASSIGNOR, BY MESNE ASSIGNMENTS, TO INTERNATIONAL HARVESTER CORPORATION, A CORPORATION OF NEW JERSEY.

INTERNAL-COMBUSTION-ENGINE MIXER.

1,150,224.  Specification of Letters Patent.  Patented Aug. 17, 1915.

Application filed January 6, 1913. Serial No. 740,480.

*To all whom it may concern:*

Be it known that I, HENRY J. PODLEŠÁK, a citizen of the United States, residing at Chicago, in the county of Cook and State of Illinois, have invented certain new and useful Improvements in Internal-Combustion-Engine Mixers, of which the following is a full, clear, and exact specification.

This invention relates to mixers for internal combustion engines, and more particularly to valve mechanisms and arrangements for such mixers.

In the operation of engines using various kinds of oils for fuel, much attention, of necessity, has to be given to the positioning and the adjustment of the valves which control the supply of fuel, air, and water, where water is used. Under certain operating conditions only a small quantity of fuel is desired with little or no water. Under other conditions, a greater quantity of fuel and also a supply of water are required for the efficient operation of an engine. The valves, such as valves controlling the admission of fuel and also valves controlling the admission of water, not only have to be positioned accurately with respect to the supply nozzles, but also with respect to each other. Again, the different valves may be properly adjusted with respect to each other for controlling the supply of the ingredients of an explosive mixture in proper proportion for certain conditions, but have to be readjusted relatively to each other for other conditions.

It is, therefore, the object of my invention to provide for the supplying of the different ingredients of an explosive mixture in the proper proportions under all and varying operating conditions so that an engine may operate at all times at highest efficiency under any particular conditions. This object is accomplished by providing a valve mechanism and arrangement which is adapted to be properly positioned and adjusted to meet the requirements of successful and efficient commercial operation under various conditions.

This invention is illustrated on the accompanying sheet of drawings in which—

Figure 1 is a fragmentary view of an engine equipped with a mixer embodying my invention; Fig. 2 is a sectional view of the same mixer taken in the plane of line 2—2 of Fig. 1; Fig. 3 is a sectional view of the same mixer taken in the plane of line 3—3 of Fig. 2; Fig. 4 is a detail view showing a water controlling valve and a fuel controlling valve adjustably mounted upon a stem; and, Fig. 5 is a side elevation of one of said valves.

The various novel features of my invention will be apparent from the description and drawings and will be particularly pointed out in the appended claims.

This invention is illustrated in connection with an internal combustion engine having a cylinder 10, secured to the end head 11 of which, is a mixer 12 having a mixing chamber 13, including a passageway 14 through which fuel is adapted to flow, and a passageway 15 through which water is adapted to flow, said passageways being separated by a partition 16. These two passageways 14 and 15 terminate in a single passageway 17 where the fuel, air and water mix preparatory to passing into the combustion chamber of the engine. Mounted on top of the mixing chamber 12 is a conduit 18 having an air passageway registering with the passageways 14 and 15 in the mixing chamber 12.

Secured to one side of the mixing chamber is a receptacle 19 having a fuel reservoir 20 and water reservoir 21. The fuel in the fuel reservoir is supplied from any desired source through an inlet pipe 22, and the fuel in said fuel reservoir is maintained at a constant pressure by means of an overflow pipe having an outlet 23. In like manner, the water reservoir is provided with a supply pipe 24 and overflow pipe having an outlet 25. Fuel and water are adapted to be drawn up from their respective reservoirs and out through their respective nozzles 26 and 27 when air passes down through the passageways 14 and 15 past said nozzles upon the occurrence of each inhalation stroke of the piston of the gas engine. The fuel nozzle 26 which enters the mixing chamber at a lower level than the water nozzle, is provided with a manually controlled needle valve 28, and the water nozzle is provided with a similar manually controlled needle valve 29.

The mixing chamber 12 is mounted upon a casting 30 having a passageway through which the hot exhaust gases of the engine may pass to heat up the walls thereof after which the gases pass out through an exhaust pipe 31. Removably secured to the side of the casting 30 is a heater 32 adapted to receive its heat from the casting 30 through which the exhaust gases pass. This heater, or preheater 32 as it may properly be called, is provided with a passageway through which the fuel and air pass and in which said fuel and air are thoroughly mixed, the fuel being thoroughly vaporized before passing therefrom to be mixed with water.

Mounted upon a stem 34 extending through the mixing chamber 12 is a fuel controlling valve 35 located in the passageway 14 of the mixer, and also mounted upon said stem is a water controlling valve 36 mounted in the passageway 15 of said mixer. These controlling valves 35 and 36 have integrally formed sleeves 37 and 38 respectively. Each of these valves is adjustably mounted upon the stem 34, the valves being not only adjustably mounted thereon but being adjustable with respect to each other. Said valves 35 and 36 may be secured to the stem 34 in any desired position by means, for example, of set-screws 39 and 40. Of course, other means may be used for securing the valves to the stems so that the valves may be adjusted with respect thereto, the set-screws being shown merely as one means for accomplishing the desired result. The valves can be adjusted while the engine is in operation due to the fact that they are so accessible. The stem 34 is provided with a head 41 against which one end of the sleeve 38 abuts, the other end 42 of the sleeve 38 abutting the other valve 35.

The water controlling valve 36 is provided with a rounded portion 43 so that the water supply from the water nozzle 27 can be cut on and off gradually. The fuel controlling valve 35 is not only provided with a similar rounded portion 44 for the same purpose, but is also provided with a notched portion 45 which, in one position, namely the closed position of said valve, embraces the fuel controlling nozzle 26. In this position, whatever air is drawn through the notched portion 45, of necessity has to pass the fuel nozzle 26, thereby drawing therefrom a charge of fuel. The fuel controlling nozzle preferably projects into the passageway 14. However, this is not necessary for the reason that the notched portion 45 of valve 35 can be arranged to be opposite the fuel supplying port in one position of said valve to limit the supply of fuel therefrom.

Secured to the valve stem 34 is an arm 46 connected to which is a link 47, which in turn is secured to an arm 48, the arm 48 being clamped to a stem 49 upon which is mounted a throttling valve 50. Also secured to the arm 48 is a rod 51 which is adapted to be actuated by a speed governor, not shown, in accordance with operating conditions. In this way the fuel, water and throttling valves are actuated.

Under ordinary full-load full-speed conditions the valves are all full open and air is drawn down through the passageways 14 and 15, drawing supplies of fuel and water from the fuel and water nozzles upon each inhalation stroke of the piston of the engine. In this particular mixer the fuel and air pass down through the passageway 14, through the preheater 32, where the air and fuel are thoroughly mixed and the latter thoroughly vaporized, after which water is mixed with said vaporized mixture in the passageway 17. Then all of the ingredients of the explosive mixture pass the throttling valve 50 and into the combustion chamber of the engine. If the load should be decreased, the speed thereby increased, all of the valves through the agency of the speed governor would be moved toward a closed position, thereby decreasing the supply of fuel, air, and water. Under friction load conditions the water controlling valve 36 is completely closed, preventing the admission of any water, and the fuel controlling valve 35 is in a position shown by dotted lines in Fig. 3. In this position the notched portion 45 of the fuel controlling valve 35 embraces the fuel nozzle 26, there being only a small clearance between the fuel nozzle and the notched portion of the valve to permit only the passage of a limited supply of air but at a relatively high velocity for drawing in a charge of fuel. As stated before, under friction load conditions, the water supply is completely shut off and a relatively rich fuel charge supplied to the combustion chamber, a richer mixture being needed under such light load conditions, for the reason that the compression is low under such light load or friction load conditions. The water when supplied, as is well known, is for the purpose of rendering the explosive mixture more lean and for preventing pre-ignition of the explosive mixture.

So far, the fuel controlling and water controlling valves have been considered as being in certain fixed positions, but for various reasons it may be desired to adjust either of the valves 35 or 36 with respect to their supporting stem 34 or with respect to each other. For instance, it may be desirable to adjust the water controlling valve 36 so that the water supply will be shut off sooner or later for a given adjustment of the fuel controlling valve.

When working an engine at or below thirty per cent. of its rated power, the working temperature is just about high enough for maintaining the proper vaporization of the heavy hydrocarbon fuel oils. When, however, the engine is loaded with more than thirty per cent. of its rated load, the working temperature rises somewhat too high, causing the mixture to be so highly heated that it explodes, when ignited, with great violence, producing pounding. The temperature may rise at heavier loads even to cause pre-ignition. To overcome these violent explosions and possible pre-ignition, it is necessary to further cool the walls of the combustion chamber by what is known as internally cooling; that is, by injecting small quantities of water into the working mixture drawn into the combustion chamber as above set forth. When water is injected into the explosive mixture when the engine is operating below thirty per cent. of its rated power, the explosive mixture re-condenses, adheres to the walls of the combustion chamber causing the engine ultimately to stop. These facts are particularly true of engines operating in the temperate climates. If the fuel controlling and water controlling valves are properly set for conditions in the temperate climates in accordance with the above outline, the engine will work satisfactorily. If, however, the engine is to be used in a colder climate, or in the cold zones, it will be necessary for the water to be shut off earlier. In other words, the water controlling valve will have to be adjusted with respect to the fuel controlling valve so that said water controlling valve will permit water to be injected into the combustion chamber, only when the engine is operating at or above fifty per cent. of its rated power. Again, if the engine is to be used in a southern climate, the water controlling valve should be adjusted so that it will permit water into the combustion chamber when the engine is operating at about twenty per cent. of its rated power. Thus the necessity of adjusting the valves with respect to each other. Again, for experimental purposes, the desirability of adjusting the valves with respect to each other is readily apparent.

It is evident that the fuel controlling and water controlling valves may be adjusted in various ways, and may be given various shapes, and that other arrangements and modifications may be made, and it is my intention to cover all such arrangements and modifications which do not involve a departure from the spirit and scope of my invention as set forth in the appended claims.

What I claim as new is:

1. In a mixer for internal combustion engines, the combination of a chamber having two passageways through which fluids pass, liquid supply means associated with said passageways, a controlling valve in each passageway, a stem on which said valves are adjustably mounted, a throttle valve, and an operative connection between all of said valves.

2. In a mixer for internal combustion engines, the combination of a chamber having two passageways, a fuel supplying nozzle projecting into one of said passageways, and a water supplying nozzle associated with the other, a valve controlling the admission of fuel from said fuel nozzle, a valve controlling the admission of water from said water nozzle, and means in common on which said valves are adjustably mounted.

3. In a mixer for internal combustion engines, the combination of a chamber having two passageways, a fuel supplying nozzle projecting into one of said passageways, a water supplying nozzle entering the other passageway at a point on the chamber higher than the fuel supplying nozzle, a valve having a notched portion adapted to embrace said fuel supplying nozzle in one position to limit the supply of fuel, a valve adapted to permit or prevent the flow of water, and a stem upon which said valves are adjustably mounted.

4. In a mixer for internal combustion engines, the combination of a chamber, a fuel supplying nozzle projecting into said chamber, a water supplying nozzle connected to said chamber, and a controlling valve for each nozzle, one of said valves having a notched portion adapted to embrace said fuel supplying nozzle to limit the flow therefrom.

5. In a mixer for internal combustion engines, the combination of a chamber, fuel and water supplying nozzles associated therewith, and a controlling valve for each of said nozzles, one of said valves having a notched portion adapted to embrace one of said nozzles to limit the flow therefrom.

6. In a mixer for internal combustion engines, the combination of a chamber, fuel and water supplying nozzles entering said chamber at different levels, and a controlling valve for each of said nozzles, one of said valves having a notched portion adapted to embrace the fuel supplying nozzle to limit the flow therefrom, the other valve being below the level of the water supplying nozzle and adapted to prevent the flow of water therefrom.

7. In a mixer for internal combustion engines, the combination of a chamber, fuel and water supplying nozzles entering said chamber at different levels, a controlling valve for each of said nozzles, one of said valves having a notched portion adapted to embrace the fuel supplying nozzle to limit the flow therefrom, the other valve being below the level of the water supplying nozzle and adapted to prevent the flow of water therefrom, and a stem upon which each of said valves is adjustably mounted.

8. In a mixer for internal combustion engines, the combination of a chamber, fuel and water supplying nozzles entering said chamber at different levels, a controlling valve for each of said nozzles, one of said valves having a notched portion adapted to embrace the fuel supplying nozzle to limit the flow therefrom, the other valve being below the level of the water supplying nozzle and adapted to prevent the flow of water therefrom, a stem upon which each of said valves is adjustably mounted, and a throttling valve adapted to be actuated with said fuel and water controlling valves.

9. In a mixer for internal combustion engines, the combination of a chamber having two passageways, a single outlet therefor, a fuel supplying nozzle entering one of said passageways, a water supplying nozzle entering the other passageway at a higher level, a controlling valve for each of said nozzles, one having a notched portion adapted to embrace said fuel supplying nozzle to limit the flow therefrom, the other valve being adapted to alternately permit and prevent the flow of water, a stem upon which said valves are adjustably mounted, a throttling valve in said outlet, and an operative connection between all of said valves.

10. In a mixer for internal combustion engines, the combination of a chamber, fuel and water controlling valves in said chamber, said valves having associated ports, one of said valves having a notched portion which in one position of said valve is opposite one of said ports to limit the supply therefrom.

11. In a mixer for internal combustion engines, the combination of a chamber having two passageways, fuel and water supplying members associated with different ones of said passageways, and a controlling valve in each of said passageways for controlling the supply from said members, one of said valves having a notched portion which in one position of said valve is opposite one of said members to limit the supply therefrom.

12. In a mixer for internal combustion engines, the combination of a chamber having two passageways in the wall of one of which is a fuel supplying port and in the wall of the other is a water supplying port, a valve in one of said passageways for controlling the supply of water, and a valve in the other passageway for controlling the supply of fuel, the latter valve having a notched portion which in one position of said valve is opposite said fuel supplying port to limit the supply therefrom.

Chicago, Ill., Dec. 17, 1912.

In testimony whereof I affix my signature, in the presence of two witnesses.

HENRY J. PODLEŠÁK.

Witnesses:
JOHN KARMAZIN,
WALTER DOROSH.